United States Patent
Isenmann et al.

(10) Patent No.: US 8,972,786 B2
(45) Date of Patent: Mar. 3, 2015

(54) STARTING A FIELD DEVICE

(71) Applicant: VEGA Grieshaber KG, Wolfach (DE)

(72) Inventors: Andreas Isenmann, Haslach im Kinzigtal (DE); Martin Gaiser, Alpirsbach (DE)

(73) Assignee: VEGA Grieshaber KG, Wolfach (DE)

( * ) Notice: Subject to any disclaimer, the term of this patent is extended or adjusted under 35 U.S.C. 154(b) by 151 days.

(21) Appl. No.: 13/655,121

(22) Filed: Oct. 18, 2012

(65) Prior Publication Data

US 2013/0117612 A1 May 9, 2013

(30) Foreign Application Priority Data

Nov. 4, 2011 (EP) ...................... 11187882

(51) Int. Cl.
*G06F 11/00* (2006.01)
*G05B 19/042* (2006.01)
*G06F 11/22* (2006.01)

(52) U.S. Cl.
CPC ........ *G05B 19/0428* (2013.01); *G06F 11/2284* (2013.01); *G05B 2219/23307* (2013.01); *G06F 2011/2278* (2013.01)
USPC ............................................. 714/36; 714/37

(58) Field of Classification Search
CPC ....................................................... G06F 11/26
USPC ................. 714/36, 37, 51, 758, 742
See application file for complete search history.

(56) References Cited

U.S. PATENT DOCUMENTS

| | | | | |
|---|---|---|---|---|
| 5,542,082 | A | * | 7/1996 | Solhjell .......................... 711/115 |
| 6,065,148 | A | * | 5/2000 | Obermeier et al. ............ 714/763 |
| 6,108,598 | A | * | 8/2000 | Sumitani ........................... 701/1 |
| 7,555,677 | B1 | * | 6/2009 | Wiley et al. ...................... 714/36 |
| 2002/0046362 | A1 | | 4/2002 | Bolz |
| 2004/0181716 | A1 | | 9/2004 | Stern et al. |
| 2005/0033952 | A1 | | 2/2005 | Britson |
| 2009/0306796 | A1 | * | 12/2009 | Budmiger ......................... 700/86 |

FOREIGN PATENT DOCUMENTS

| | | |
|---|---|---|
| DE | 41 22 371 | 1/1993 |
| DE | 196 42 737 | 10/1997 |
| DE | 199 09 051 | 9/1999 |
| DE | 199 46 096 | 4/2001 |
| DE | 100 30 991 | 1/2002 |
| DE | 10 2005 051 769 | 5/2007 |

* cited by examiner

*Primary Examiner* — Dieu-Minh Le
(74) *Attorney, Agent, or Firm* — Fay Kaplun & Marcin, LLP

(57) ABSTRACT

During starting of a field device for pressure measurement, flow measurement and/or fill level measurement, which field device including a memory that includes a boot memory region in which a boot function is stored, and an operating memory region in which an operating function is stored, the following steps are carried out: carrying out the boot function; determining whether a memory check of the operating memory region is to be carried out; carrying out a memory check of the operating memory region when it has been determined that a memory check is to be carried out; and carrying out the operating function.

16 Claims, 1 Drawing Sheet

STARTING A FIELD DEVICE

REFERENCE TO RELATED APPLICATIONS

This application claims the benefit of the filing date of EP Patent Application Serial No. EP 11 187 882.3 filed 4 Nov. 2011, the disclosure of which application is hereby incorporated herein by reference.

TECHNICAL FIELD

The present invention relates to a method, to a computer program, and to a computer-readable medium for starting a field device, as well as to a field device.

BACKGROUND INFORMATION

Field devices for measuring physical quantities in industrial plants frequently comprise a controller that comprises an electronic processor by means of which a sensor of the field device may be controlled, and an acquired measured value of the physical quantity may be further processed. In this arrangement the corresponding system software is as a rule stored in a non-volatile memory in the controller.

Certain types of field devices are designed to become active only at defined points in time and, for example, to carry out a measurement. In this manner energy may be saved that possibly only may be provided by a battery. Before each measurement process the field device is then started and the controller carries out a boot routine that also includes checking the memory in order to check that in the meantime the system software has not been corrupted.

In order to check the memory a cyclic redundancy check, CRC, may be carried out. As a rule this is very time-consuming and the system start takes a correspondingly long time.

SUMMARY OF THE INVENTION

The present invention relates to providing an energy-saving and quick field device.

A first aspect of the invention relates to a method for starting a field device.

In this context the term "field device" may refer to a measuring device that is arranged in close spatial proximity to an industrial plant (for example a tank or a fluid line) or that is arranged on or in the industrial plant and is designed to measure, to acquire and/or to further process a physical variable of the industrial plant. In particular, the field device may be designed to carry out pressure measurement, flow measurement and/or fill level measurement.

The field device may comprise a memory that includes a boot memory region in which a boot function is stored, and an operating memory region in which an operating function is stored. If the system software of a field device is to be interchangeable, for example in order to add or update particular program functions, the system software may be divided into a boot part and a main part or operating part. The boot function may then form part of the boot part, and the operating function may be part of the operating part. For this purpose the memory may be divided into a boot memory region in which the boot part is stored, and into an operating memory region in which the operating part is stored. The actual measuring and processing functionality of the field device is then located in the operating part that is also to be designed so as to be exchangeable. For example, the operating memory region may be overwritten, and in this manner a new operating part may be stored in the field device. The non-volatile memory may, for example, comprise a FLASH memory in which the boot memory region and the operating memory region are located.

According to one embodiment of the invention, the method comprises the steps of: carrying out the boot function; determining whether a memory check of the operating memory region is to be carried out; carrying out a memory check of the operating memory region when it has been determined that a memory check is to be carried out; and carrying out the operating function.

The field device may thus be started in that the boot part is activated during switching on, and said boot part may then check whether a valid operating part is present and may start this operating part where appropriate. In this case the memory check by means of which it is to be checked whether the operating part of the system software and in particular the operating function are correctly stored needs to be carried out only if this appears necessary. In this manner the startup routine may be shortened and accelerated, and the energy consumption of the field device may be reduced.

Since, as a rule, the code of the operating part does not change it is normally not necessary to carry out a memory check during each startup routine of the field device. Without a memory check the startup routine is appreciably accelerated, and in this manner it is possible, for example, for the measured value to be available more quickly at a sensor.

According to one embodiment of the invention, the memory check comprises a cyclic redundancy check, CRC. By means of a cyclic redundancy check it is possible to check whether a memory region has been changed. To this effect a checksum is calculated from the current content of the memory region and is compared to a checksum that was calculated at some earlier point in time. If the two checksums differ, it may be assumed that the content of the memory region has changed.

According to one embodiment of the invention, the boot function is carried out when the field device is activated. For example, most of the time the field device is in a sleep mode or in the switched-off state; it is woken up or switched on by an external signal. After external activation it is then possible to carry out the shortened startup routine. In particular in a field device with energy management, which takes, for example, its energy from a battery, this may have a positive effect because the startup routine takes place after each waking-up and may thus be shortened.

According to one embodiment of the invention, determination that the memory check is to be carried out takes place when a first counter and a second counter, which are stored in a non-volatile memory region, do not match. The two counters may be stored in an EPROM. For example, after the boot function has been carried out, the first counter is incremented, and after initialization or carrying out the operating function the second counter is incremented. If no program error occurs and if the two counters have matched prior to the startup routine, the two counters will also match afterwards. If this is not the case, it may be assumed that an error has occurred during the carrying out of the operating function, and a memory check should be carried out.

Thus two counters may be implemented in the field device. The first counter acquires the number of passes of the boot function in the boot part, and the second counter acquires the number of successful starts of the main part by the operating function. As long as these counters are identical it is assumed that the boot part was able to successfully start the operating part every time, and it is therefore possible to do away with the cyclic redundancy check of the operating part during the startup routine.

According to one embodiment of the invention, the method furthermore comprises the step of: setting that during the next start no memory check of the operating memory region is carried out when the operating memory region was checked. This may take place, for example, in that the first counter and the second counter are reset to the same value, for example 0. This may take place, for example, following a successful memory check.

According to one embodiment of the invention, the method further comprises the step of a cyclical memory check of the operating memory region. After the startup routine the memory check (even when the two counters match) may be carried out at regular intervals, i.e. cyclically. This may take place, for example, when the field device is waiting for further data from the sensor and is active anyway. Furthermore, it may happen that bytes in the main part have been changed, which bytes, while not preventing the start of the operating part by the operating function, may nevertheless result in errors during the run time. In order to detect this, the memory check may be carried out cyclically, by means of a special diagnostic task or diagnostic function, during the run time of the field device.

According to one embodiment of the invention, the method furthermore comprises the steps of: activating a watchdog in the case of an error of the field device; setting that during the next start of the field device a memory check of the operating region is to be carried out when the watchdog has been activated; and resetting the field device by the watchdog so that a restart of the field device is carried out. This may take place in that the first counter and the second counter are set to different values, for example to 1 and 0.

The term "watchdog" may refer to a part of the processor or to a separate component of the field device that monitors the processor for correct functioning. For example, the processor may needs to transmit a signal to the watchdog at regular intervals. If this signal is absent, for example if the processor has crashed or is in an infinite loop, the watchdog assumes that an error has occurred and restarts the processor, which then carries out the startup routine.

If the watchdog is activated after the boot function and the operating function have successfully been carried out, the two counters may also actively be set to different values by the watchdog so that during the startup routine a memory check of the operating memory region is carried out.

According to one embodiment of the invention, an IO signal to the processor of the field device is set to a defined level by the watchdog. In order to detect a restart triggered by a watchdog, furthermore, a signal level may be used. In this process, during the triggering of the restart, the watchdog ensures that a signal is set to a defined level. As soon as the boot part detects this defined level, the two monitoring counters are set to different values by the boot part, which results in the memory check being carried out.

According to one embodiment of the invention, it is detected that the memory check is to be carried out when an IO signal of the watchdog has a defined signal level. As an alternative or in addition to the counters, the watchdog may also set a signal level to a defined level so that the processor during the restart may detect the activity of the watchdog with reference to this level, and may thus trigger a memory check.

A further aspect of the invention relates to a computer program which, when executed by a processor, instructs the processor to carry out the steps of the method as described above and below. The computer program may comprise functions from the boot memory region and the operating memory region.

A further aspect of the invention relates to a computer-readable medium in which such a computer program is stored. The computer-readable medium may, for example, be the non-volatile memory of the field device. A computer-readable medium may, however, also be a diskette, a hard disk, a USB memory device, a RAM, a ROM, a FLASH or an EPROM. A computer-readable medium may also be a data communication network, for example the internet, that makes it possible to download a program code.

A further aspect of the invention relates to a field device for pressure measurement and/or fill level measurement as described above and below. It is to be understood that characteristics of the method may also be characteristics of the field device and vice versa.

According to one embodiment of the invention, the field device comprises a controller that is designed to carry out the method as described above and below. The field device may comprise a sensor that is designed to carry out pressure measurement, flow measurement and/or fill level measurement.

In summary, by means of the method described, the field device may monitor whether or not a system start was successful. If the preceding system start was successful, during the current system start it is possible to dispense with a cyclic redundancy check of the operating part when executing the boot part, and instead the operating part may be started immediately. If in this manner a non-executable operating part is started, this may result in a restart of the field device (for example triggered by an existing watchdog), and for the next system start the cyclic redundancy check may be reactivated.

Two counters stored in the field device may be used to monitor the startup routine. As soon as the two counters diverge, the startup routine was either unsuccessful, or the startup routine was interrupted, for example as a result of a voltage breakdown. In this case the cyclic redundancy check may be reactivated and the boot part restarts the main part only after this check has been successful. At this point in time the two counters may then be reset to 0 so that the accelerated boot procedure is active again.

Below, exemplary embodiments of the invention are described in detail with reference to the enclosed figures.

DETAILED DESCRIPTION

Figure 1:
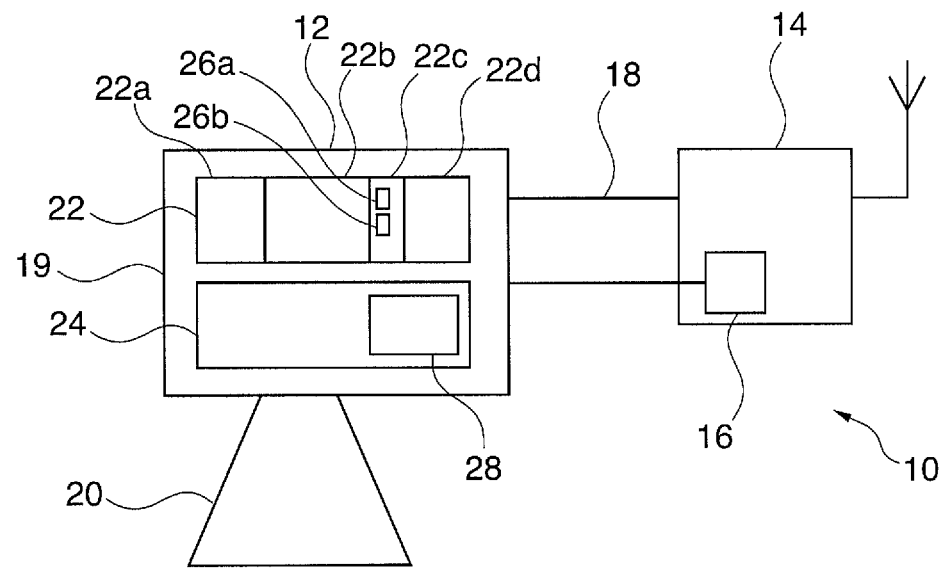
FIG. 1 schematically shows a field device according to an embodiment of the invention.

FIG. 1 shows a system 10 that comprises a field device 12 and a modem 14 connected to it. The system 10 may, for example, be affixed to an inaccessible position on a tank and may thus be operating in an autarkic manner, i.e. without the supply of external power. For example, each hour the system 10 measures a measured value, for example a fill level or a pressure in the tank, and transmits this value wirelessly to a further central system.

The modem 14 comprises a battery 16 for supplying electricity to the system 10 and is designed to receive measured values 18 from the field device 12 and to onward transmit them wirelessly.

The field device 12 comprises a controller 19 and a sensor 20 that is controlled by the controller 19. By way of the sensor 20, for example a fill level sensor, a flow sensor or a pressure sensor 22, the field device 12 may determine a measured value 18 and transmit it to the modem 14.

The controller of the field device 12 comprises a processor 24 and a memory 22 which the processor 24 may access. The memory 22 comprises non-volatile memory regions 22a, 22b, 22c and a volatile memory region 22d. In contrast to the volatile memory region 22d, the non-volatile memory regions 22a, 22b, 22c do not lose the data stored therein when no electricity is supplied to the field device 12.

In the memory regions 22a and 22b software is stored that may be executed by the processor 24. In the boot memory region 22a there is the boot software which, as a rule, is not customizable but is identical in all the field devices 12 of the same type. In the main memory region 22b the operating software is located which carries out, for example, control of the sensor 20 and transmission of the data 18, which operating software is customizable to particular applications. A FLASH memory may be used for the memory regions 22a, 22b. In this manner the operating software may be updated in the operating memory region 22b by overwriting.

The memory region 22c is used for storing data that is to be available also during the next start of the field device 12, for example the first counter 26a and the second counter 26b. An EPROM memory may be used for the memory region 22c. The term "memory region 22d" may refer to the RAM memory which the processor 24 may use during operation for temporarily storing data.

The processor 24 comprises a hardware watchdog 28 that monitors the field device 12 for correct operation. To this effect the processor 24 needs to transmit a signal to the watchdog 28 at regular intervals. If this signal fails to materialize, the watchdog assumes that the processor has crashed or is in an infinite loop and restarts the field device 12, i.e. carries out a reset of the processor 24.

All the elements 22a, 22b, 22c, 22d, 24, 28 of the field device 12 may be implemented on a single chip. However, it is also possible for individual elements to be implemented with separate components.

Figure 2:
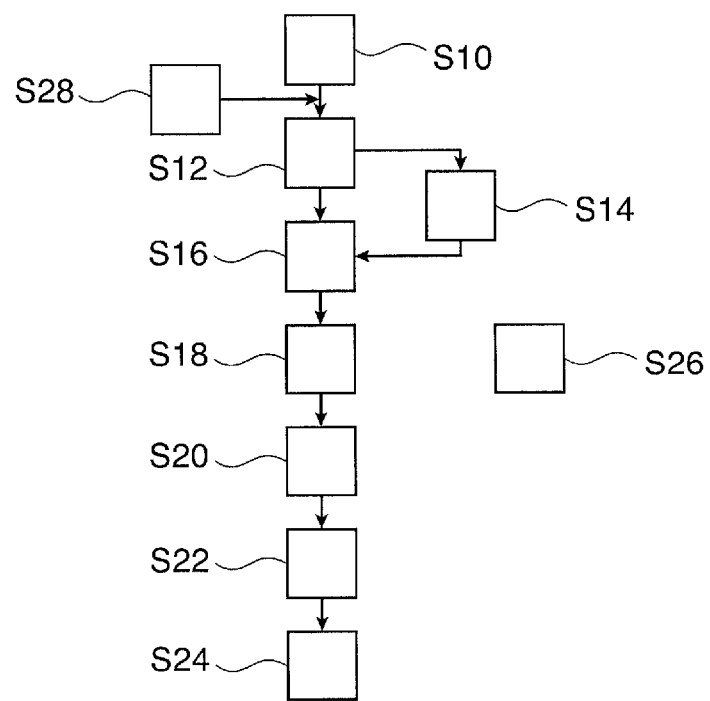
FIG. 2 shows a flow chart of a method for starting a field device according to an embodiment of the invention.

FIG. 2 shows a method for starting and operating the field device 12, which method may be carried out autonomously by the system 10.

In step S10 the modem 14 starts to supply electrical power to the field device 12. This may, for example, be triggered by a timer of the modem 14.

In step S12 the processor 24 commences to operate and calls up the boot function in the boot memory 22a. At the end the boot function checks whether the counters 26a and 26b match.

If this is not the case, in step S14 the boot function carries out a cyclic redundancy check of the main memory region 22b and resets the first counter 26a and the second counter 26b to 0. If the cyclic redundancy check shows that the data in the main memory region 22b is damaged, a corresponding message to the modem 14 or to the downstream system may take place. The field device 12 then terminates the starting process, but the boot part remains active, so that if appropriate a software update relating to the main memory region may be carried out.

After this in step S16 the boot function increases the first counter 26a. The two counters 26a, 26b then have different values.

In step S18 the boot function calls up the operating software in the main memory region 22b. The operating software then carries out its own initialization routines, for example an operating function for starting the operating software.

In step S20, after the operating software, too, has successfully completed its initialization process, the second counter 26b is incremented by the operating software, for example after initialization or execution of the operating function. If no further problems occur until the field device 24 is switched off, the two counters 26a, 26b are identical, which results in no cyclic redundancy check being carried out during the next start.

In step S22 the sensor 20 is then controlled by the operating software or by the controller 19 in such a manner that it generates a measured value 18 that is subsequently transmitted to the modem 14.

In step S24, after receiving the measured value 24, the modem 14 interrupts the electricity supply to the field device 12.

Following the boot process or the startup routine in steps S12 to S16, the processor 24 in step S26 at regular intervals calls up a diagnostic function that carries out the cyclic redundancy check of the main memory 22b. If the cyclic redundancy check shows that the data in the main memory 22b is damaged, a corresponding message may be sent to the modem 14. In this case the counters 26a and 26b are set to different values, and a restart is triggered.

At least from the point in time from which the processor 24 commences operation in step S12, it needs to transmit a signal at regular intervals to the watchdog 28. This prevents the watchdog 28 from becoming active. If this signal fails to materialize (processor crash, infinite loop), in step S28 the watchdog 28 sets the two counters 26a, 26b to different values and restarts the processor 24 so that the method is continued in step S12 and subsequently the cyclic redundancy check is carried out. As an alternative to different counter values the watchdog 28 may also set an IO signal to a defined level, which in the boot part is recognized and evaluated by the processor 24.

In addition, it should be pointed out that "comprising" does not exclude other elements or steps, and "a" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

The invention claimed is:

1. A method for starting a field device for at least one of pressure measurement, flow measurement and fill level measurement, the field device including a memory that includes a boot memory region in which a boot function is stored, and an operating memory region in which an operating function is stored, the method comprising the steps of:
   carrying out the boot function;
   determining whether a memory check of the operating memory region is to be carried out;
   carrying out a memory check of the operating memory region when it has been determined that a memory check is to be carried out;
   dispensing with a memory check of the operating memory region if a preceding system start was successful; and
   carrying out the operating function.

2. The method of claim 1, wherein the memory check comprises a cyclic redundancy check.

3. The method of claim 1, wherein the boot function is carried out when the field device is activated.

4. The method of claim 1, wherein the carrying out of the memory check step is performed when a first counter and a second counter, which are stored in a non-volatile memory region, do not match.

5. The method of claim 4, wherein after the boot function has been carried out, the first counter is incremented and wherein after the operating function has been initialized, the second counter is incremented.

6. The method of claim 1, wherein the carrying out of the memory check step is performed when a signal of a watchdog has a defined signal level.

7. The method of claim 1, further comprising the step of:
setting that during the next start no memory check of the operating memory region is carried out when the operating memory region was checked.

8. The method of claim 7, wherein a first counter and a second counter are reset to the same value.

9. The method of claim 1, further comprising the step of:
cyclically checking the memory of the operating memory region.

10. The method of claim 1, further comprising the steps of:
activating a watchdog in the case of an error of the field device;
setting that during the next start of the field device a memory check of the operating region is to be carried out when the watchdog has been activated; and
resetting the field device by the watchdog so that a restart of the field device is carried out.

11. The method of claim 10, wherein a first counter and a second counter are set to different values.

12. The method of claim 10, wherein a signal is set to a predefined level.

13. The method of claim 1, wherein the memory check is to be carried out if content of the operating memory region has changed.

14. A computer program for starting a field device for at least one of pressure measurement, flow measurement and fill level measurement, the field device including a memory that includes a boot memory region in which a boot function is stored, and an operating memory region in which an operating function is stored, the computer program when executed by a processor instructs the processor to carry out the steps of:
carrying out the boot function;
determining whether a memory check of the operating memory region is to be carried out;
carrying out a memory check of the operating memory region when it has been determined that a memory check is to be carried out;
dispensing with a memory check of the operating memory region if a preceding system start was successful; and
carrying out the operating function.

15. A non-volatile computer-readable medium in which a computer program for starting a field device for at least one of pressure measurement, flow measurement and fill level measurement is stored, the field device including a memory that includes a boot memory region in which a boot function is stored, and an operating memory region in which an operating function is stored, the computer program when executed by a processor instructs the processor to carry out the steps of:
carrying out the boot function;
determining whether a memory check of the operating memory region is to be carried out;
carrying out a memory check of the operating memory region when it has been determined that a memory check is to be carried out;
dispensing with a memory check of the operating memory region if a preceding system start was successful; and
carrying out the operating function.

16. A field device for at least one of pressure measurement, flow measurement and fill level measurement, comprising:
a memory including a boot memory region in which a boot function is stored, and an operating memory region in which an operating function is stored;
a controller configured for: carrying out the boot function; determining whether a memory check of the operating memory region is to be carried out; carrying out a memory check of the operating memory region when it has been determined that a memory check is to be carried out; dispensing with a memory check of the operating memory region if a preceding system start was successful; and carrying out the operating function; and
a sensor configured to carry out at least one of pressure measurement, flow measurement and fill level measurement.

* * * * *